United States Patent
Takaba et al.

(10) Patent No.: US 9,703,420 B2
(45) Date of Patent: Jul. 11, 2017

(54) TOUCH PANEL DEVICE AND TOUCH PANEL DRIVING METHOD

(71) Applicant: AVC TECHNOLOGY CO., LTD., Kadoma-shi, Osaka (JP)

(72) Inventors: Nobumichi Takaba, Hokkaido (JP); Takayuki Tajiri, Hokkaido (JP); Ippei Tahara, Hokkaido (JP); Shingo Arikawa, Hokkaido (JP)

(73) Assignee: AVC Technology Co., Ltd., Osaka (JP)

( * ) Notice: Subject to any disclaimer, the term of this patent is extended or adjusted under 35 U.S.C. 154(b) by 0 days.

(21) Appl. No.: 14/428,801

(22) PCT Filed: Sep. 17, 2014

(86) PCT No.: PCT/JP2014/074583
§ 371 (c)(1),
(2) Date: Mar. 17, 2015

(87) PCT Pub. No.: WO2015/041256
PCT Pub. Date: Mar. 26, 2015

(65) Prior Publication Data
US 2016/0216835 A1    Jul. 28, 2016

(30) Foreign Application Priority Data

Sep. 17, 2013 (JP) .................. 2013-192425

(51) Int. Cl.
G06F 3/041 (2006.01)
G06F 3/044 (2006.01)
G06F 3/05 (2006.01)

(52) U.S. Cl.
CPC ............ *G06F 3/0418* (2013.01); *G06F 3/044* (2013.01); *G06F 3/0416* (2013.01); *G06F 3/05* (2013.01); *G06F 2211/902* (2013.01)

(58) Field of Classification Search
CPC ......... G06F 2203/04107; G06F 3/0416; G06F 3/044
See application file for complete search history.

(56) References Cited

U.S. PATENT DOCUMENTS

2010/0289758 A1* 11/2010 Matsubara .............. G06F 3/044
                                                    345/173
2011/0148810 A1*  6/2011 Kitada .................. G06F 3/0416
                                                    345/174
(Continued)

FOREIGN PATENT DOCUMENTS

JP    2011-128857    6/2011
JP    2011-128858    6/2011
(Continued)

*Primary Examiner* — Kumar Patel
*Assistant Examiner* — Insa Sadio
(74) *Attorney, Agent, or Firm* — Nixon Peabody LLP; Jeffrey L. Costellia (57) ABSTRACT

A touch panel device (11) includes a panel main body (21) including a plurality of first electrodes (X) extending parallel to one another and a plurality of second electrodes (Y) intersecting with the first electrodes (X), and a detection section (31). The detection section (31) includes a transmission section (33) for sequentially applying a driving signal to the first electrodes (X), and a current-voltage conversion section (35) configured to scan the second electrodes (Y) and convert a current flowing through the second electrode (Y) to a voltage signal, an AD conversion section (36) configured to sample the voltage signal and convert it to digital data, and a touch determination section (37) for determining a touch position from the converted digital data. The AD conversion section (36) samples the induced signal for a sampling period which occurs after a preset time which is determined for each of the first electrodes (X) elapses since the application of the driving signal and which includes a peak of a waveform of the induced signal.

6 Claims, 8 Drawing Sheets

(56) References Cited

U.S. PATENT DOCUMENTS

| | | |
|---|---|---|
| 2011/0205172 A1 | 8/2011 | Kitada |
| 2013/0082977 A1 | 4/2013 | Noguchi et al. |
| 2013/0200906 A1* | 8/2013 | Fang .................... G06F 3/0416 324/679 |
| 2014/0152621 A1 | 6/2014 | Okayama et al. |

FOREIGN PATENT DOCUMENTS

| | | |
|---|---|---|
| JP | 2011-175335 | 9/2011 |
| JP | 2013-065212 | 4/2013 |
| JP | 2013-077042 | 4/2013 |
| JP | 5273328 | 5/2013 |

* cited by examiner

TABLE 381

| TRANSMISSION ELECTRODE | COUNT VALUE |
|---|---|
| X1 | 98145 |
| X2 | 90345 |
| X3 | 82876 |
| ... | |
| X7 | 34678 |

*FIG.8*

TABLE 381

| TRANSMISSION ELECTRODE | RECEPTION ELECTRODE | COUNT VALUE |
|---|---|---|
| X1 | Y1 | 98145 |
| | Y2 | 90345 |
| | ... | ... |
| | Y7 | 34678 |
| X2 | Y1 | 91154 |
| | ... | ... |
| | Y7 | 30683 |
| ... | ... | ... |
| X7 | Y1 | 84215 |
| | ... | ... |
| | Y7 | 29676 |

TOUCH PANEL DEVICE AND TOUCH PANEL DRIVING METHOD

TECHNICAL FIELD

The present invention relates to a touch panel device and a touch panel driving method.

BACKGROUND ART

Touch panel devices are disclosed in Patent Documents 1 to 3. In these touch panel devices, a driving signal (pulse signal) is applied to transmission electrodes, a charge/discharge current output from reception electrodes is IV-converted (current-voltage conversion), the voltage signal is integrated, the integral value is AD-converted, and presence/absence of a touch and the touch position are detected based on the digital value.

CITATION LIST

Patent Literature

Patent Document 1: Japanese Laid-Open Patent Publication No. 2011-128857
Patent Document 2: Japanese Laid-Open Patent Publication No. 2011-128858
Patent Document 3: Japanese Laid-Open Patent Publication No. 2011-175335

SUMMARY OF INVENTION

Technical Problem

In each of the touch panel devices disclosed in Patent Documents 1 to 3, the voltage signal obtained after the IV conversion is integrated over a plurality of pulse periods. Therefore, detection of presence/absence of a touch at one of the intersections of the transmission electrodes and the reception electrodes takes time. Particularly, as the size of the touch panel increases, the number of intersections sharply increases, and accordingly, the time required for detection of touches within a frame increases.

In these touch panel devices, noise is also integrated during the integration period, so that the reliability of the signal obtained after the integration is low. Particularly, in many uses, the touch panel is superposed on a display device such as a liquid crystal display panel, and contamination with periodical noise which is attributed to driving of the liquid crystal display panel, for example, cannot be avoided. One possible solution is to provide a noise filter prior to an integration circuit. However, even with such a solution applied, contamination of a signal to be integrated with noise of a certain degree cannot be avoided. Also, the filter cannot suppress noise other than noise of predetermined frequencies.

As the size of the panel increases, a delay is caused due to the resistance of the reception electrodes and the stray capacitance, and due to this delay, the time between application of a driving signal to a transmission electrode and arrival of the signal at an AD conversion circuit varies depending on the position of the transmission electrode to which the driving signal is applied. Therefore, the timing of the AD conversion deviates from the timing at which the output voltage of the IV conversion circuit exhibits a peak. Thus, there is a probability that detection of presence/absence of a touch is incorrect.

In connection with this problem, Patent Document 2 discloses adjusting the timing of the AD conversion. Note that, however, this is merely adjusting the timing in an undifferentiated manner such that the noise is minimized. Therefore, deviation of the timing of the AD conversion from a peak of the voltage signal obtained after the current-voltage conversion cannot be avoided.

The present invention was conceived in view of the above circumstances. An object of the present invention is to provide a touch panel device which is capable of high speed operation and which is capable of correct detection of a touch position, and a touch panel driving method.

Solution to Problem

To achieve the above object, a touch panel device of the present invention includes: a panel main body including a plurality of first electrodes extending parallel to one another and a plurality of second electrodes extending parallel to one another, the first and second electrodes being in a lattice arrangement; and a detection section configured to apply a driving signal to the first electrodes, sample an induced signal which is induced to the second electrodes by the application of the driving signal, and detect a touch position based on a sampling value, wherein the detection section samples the induced signal in a sampling period set at a timing which is determined beforehand according to a first electrode to which the driving signal is to be applied.

The sampling period is set, for example, at a timing which is determined beforehand according to a first electrode to which the driving signal is applied and within a period which includes a timing of a peak of a waveform of the induced signal.

The sampling period is, for example, shorter than one period of the driving signal.

The detection section, for example, samples the induced signal for a predetermined sampling period after a preset time which is determined beforehand for each of the first electrodes to which the driving signal is applied elapses since the application of the driving signal.

The detection section, for example, samples the induced signal for a predetermined sampling period after a preset time which is determined beforehand for each of combinations of the first electrodes to which the driving signal is applied and the second electrodes to which the induced signal is induced elapses since the application of the driving signal.

The detection section includes, for example, an application section for applying the driving signal to the plurality of first electrodes, and a sampling section connected with one end of each of the plurality of second electrodes for sampling the signal induced to the second electrodes, and the preset time is determined relative to an application timing of the driving signal to each of the first electrodes such that the preset time increases as the first electrode is more distant from one end of the second electrodes.

The detection section includes an application section for sequentially applying the driving signal to the plurality of first electrodes, a current-voltage conversion section configured to sequentially select the plurality of second electrodes and convert a current flowing through the selected second electrode to a voltage signal, an AD conversion section configured to sample the converted voltage signal and convert it to digital data, and a section for determining presence/absence of a touch from the digital data converted by the AD conversion section.

To achieve the above object, a touch panel driving method of the present invention includes: applying a driving signal to a first electrode of a panel which includes a plurality of first electrodes extending parallel to one another and a plurality of second electrodes extending parallel to one another, the first and second electrodes being in a lattice arrangement; and sampling an induced signal which is induced to the second electrodes by the application of the driving signal in a sampling period set at a timing which is determined beforehand according to a first electrode to which the driving signal is to be applied.

Advantageous Effects of Invention

According to the above-described structure, the sampling period can be set, for example, within a short period which includes a timing at which an induced signal exhibits a peak. Such a setting enables sampling of an induced signal which has a relatively large signal level. The influence of noise can be limited within the sampling period only, and even when the timing at which the induced signal exhibits a peak varies among the transmission electrodes, the device is less vulnerable to the influence of the variation. Thus, more correct detection of a touch position is possible. Further, integration of the induced signal along the time direction is not necessary, and therefore, high speed operation is possible. Thus, according to the present invention, it is possible to provide a touch panel device which is capable of high speed operation and which is capable of correct detection of a touch position.

BRIEF DESCRIPTION OF DRAWINGS

FIGS. 5(a) to 5(e) show the operation waveforms of signals in respective sections shown in FIG. 1.

DESCRIPTION OF EMBODIMENTS

Hereinafter, a touch panel device 11 and a touch panel driving method according to an embodiment of the present invention are described with reference to the drawings.

Figure 1:
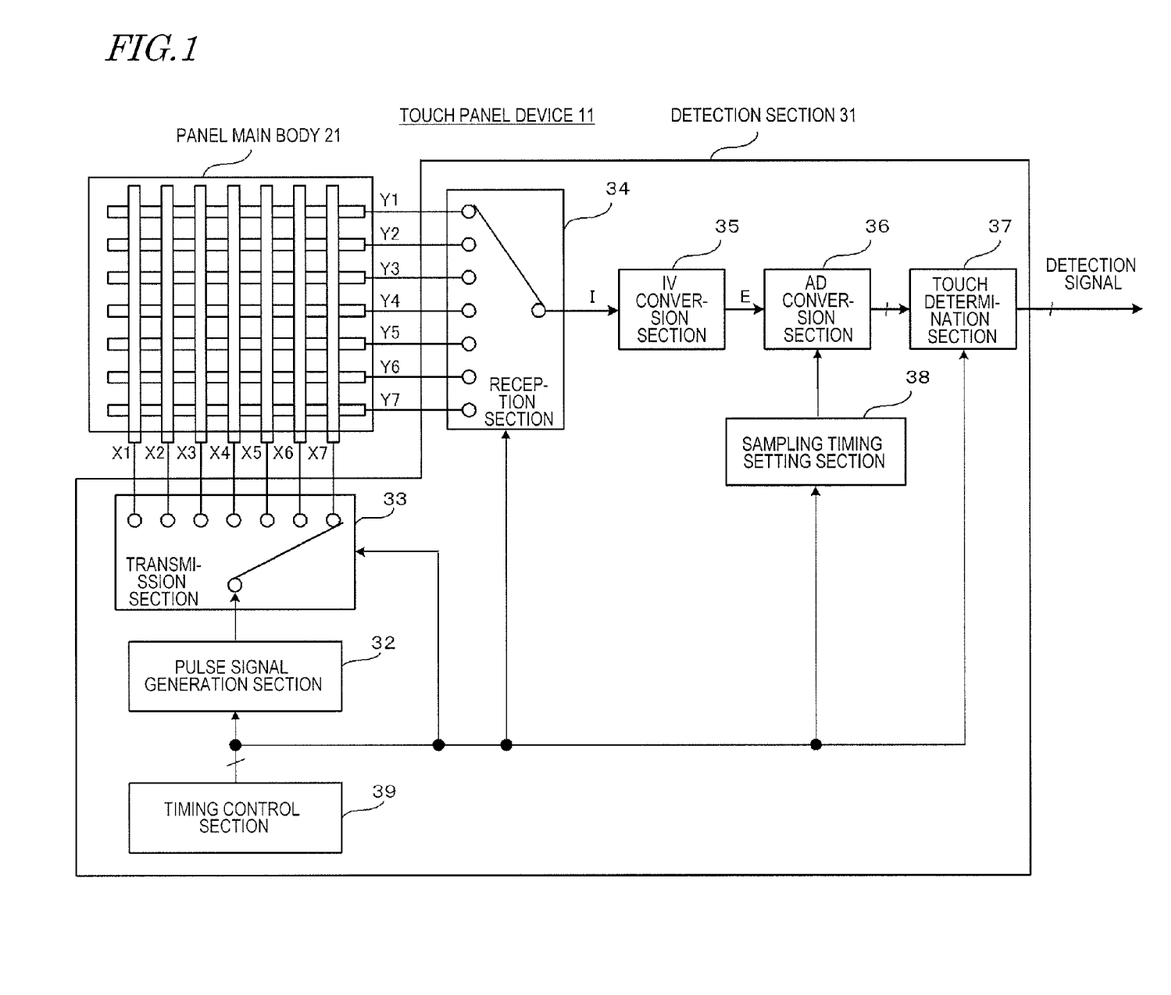
FIG. 1 is a block diagram of a touch panel device according to Embodiment 1 of the present invention.

As shown in FIG. 1, the touch panel device 11 of the present embodiment includes a panel main body 21 which has a touch surface on which touch actions are to be made and a detection section 31 for detecting a touch position over the touch surface of the panel main body 21.

The panel main body 21 includes a plurality of transmission electrodes (first electrodes) X1 to X7 extending parallel to one another and a plurality of reception electrodes (second electrodes) Y1 to Y7 extending parallel to one another, which are in a lattice arrangement. The transmission electrodes X1 to X7 and the reception electrodes Y1 to Y7 are protected by a protection insulating film provided at the front surface side. The surface of the protection insulating film serves as the touch surface on which touch actions are to be made by a finger or the like. The transmission electrodes X1 to X7 and the reception electrodes Y1 to Y7 are supported by an insulative supporting sheet. The front surface side of this supporting sheet is provided with the transmission electrodes X1 to X7. The rear surface side of the supporting sheet is provided with the reception electrodes Y1 to Y7.

At electrode intersections formed by the transmission electrodes X1 to X7 and the reception electrodes Y1 to Y7 overlapping one another with the supporting sheet interposed therebetween, capacitors are formed. When a touch action is made by a finger or the like, the electrostatic capacitance of the capacitor at a touched electrode intersection substantially decreases.

When the detection section 31 applies a driving signal (pulse voltage signal) to transmission electrodes Xi (i=1 to 7), a charge/discharge current flows to the reception electrodes Y1 to Y7 via the capacitors which are present between the electrodes. This charge/discharge current is produced by electrostatic induction between the transmission electrode X and the reception electrode Y and is a kind of induced signals. When a touch action is made, the electrostatic capacitance of the capacitor of the electrode intersection at the touch position decreases, so that the charge/discharge current flowing to the reception electrode Yj (j=1 to 7) also decreases. The detection section 31 detects this charge/discharge current, i.e., the variation of an induced-electricity signal, thereby detecting the touch position.

The detection section 31 is configured to sequentially apply driving signals (pulse signals) to the transmission electrodes X1 to X7 of the panel main body 21, detect charge/discharge currents flowing to the reception electrodes Y1 to Y7, and detect presence/absence of a touch and the position of the touch according to the variation of the detected currents. The detection section 31 includes a pulse signal generation section 32, a transmission section 33, a reception section 34, an IV (current-voltage) conversion section 35, an AD (analog-digital) conversion section 36, a touch determination section 37, a sampling timing setting section 38, and a timing control section 39.

The pulse signal generation section 32 periodically generates driving signals which are to be applied to the transmission electrodes X1 to X7 under the control of the timing control section 39.

The transmission section 33 is connected with the pulse signal generation section 32 and the transmission electrodes X1 to X7 and is configured to apply the driving signals generated by the pulse signal generation section 32 to the transmission electrodes X1 to X7. The transmission section 33 is realized by, for example, a multiplexer. As illustrated in the example shown in FIGS. 5(a) to 5(c), the transmission section 33 applies to the $i^{th}$ transmission electrode Xi (i=1 to 7) driving pulses which are equal in number to the reception electrodes Y (in the present embodiment, 7), and thereafter applies driving pulses to the $i+1^{th}$ transmission electrode X(i+1).

Figure 5:
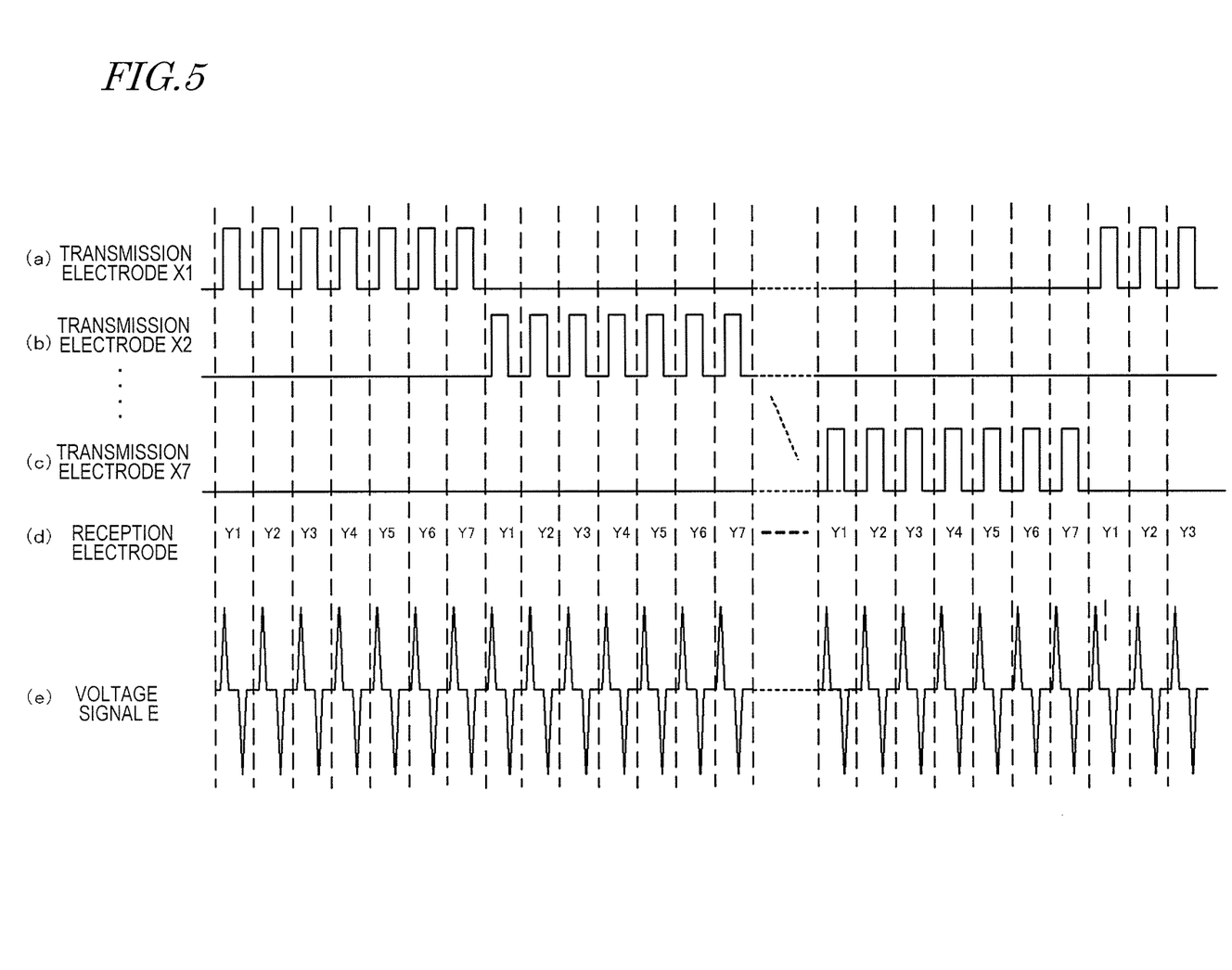

The reception section 34 shown in FIG. 1 scans the reception electrodes Y1 to Y7 under the control of the timing control section 39 as shown in FIG. 5(d) and takes in a current flowing through the reception electrode Yj (j=1 to 7). This current is a charge/discharge current which flows through the reception electrode Yj due to application of a driving signal to the transmission electrode Xi. This charge/discharge current is produced by electrostatic induction between the transmission electrode X and the reception electrode Y and is a kind of induced signals.

The IV (current-voltage) conversion section 35 converts, via the reception section 34, the charge/discharge current I flowing through the reception electrode Yj to a voltage signal E which corresponds to the current value. This voltage signal E is also produced by electrostatic induction between the transmission electrode X and the reception electrode Y and is a kind of induced signals. The charge/discharge current I flowing through the reception electrode Yj is such an alternating voltage that electric currents of opposite polarities alternately occurs corresponding to rising and falling edges of the driving signal. Therefore, the voltage signal E output from the IV conversion section 35 is also such an alternating voltage that the polarity reverses corresponding to rising and falling edges of the driving signal as shown in FIG. 5(f).

Figure 6:
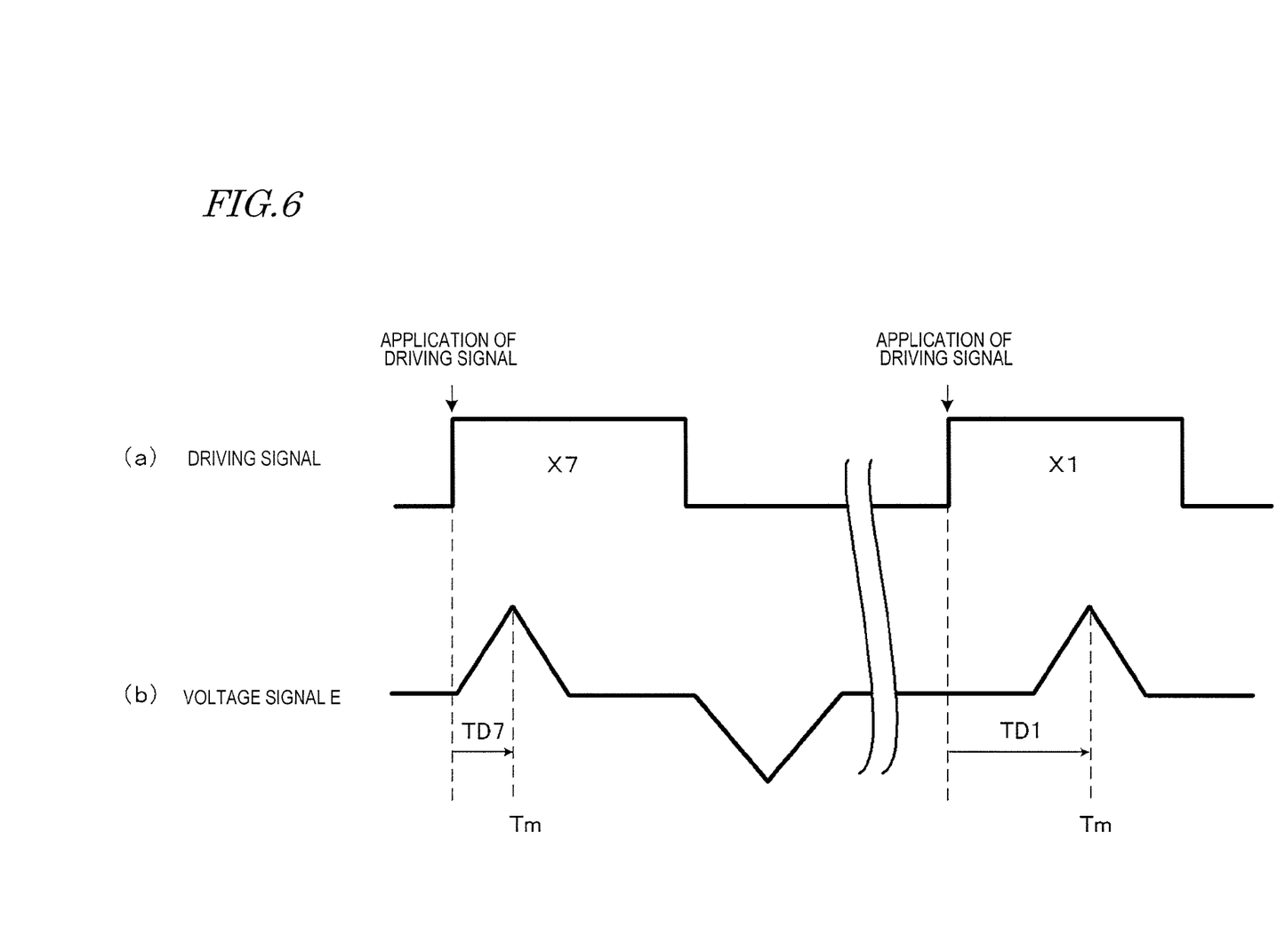
FIGS. 6(a) and 6(b) are partially-enlarged views of the waveforms shown in FIG. 5, illustrating that delay time TD varies due to the transmission electrodes.

As shown in FIGS. 6(a) and 6(b), the delay time TD between application of the driving voltage to the transmission electrode Xi and the timing Tm at which the voltage signal E output from the IV conversion section 35 exhibits a peak varies depending on the position of the transmission electrode Xi. Specifically, the delay time TD increases as the transmission electrode Xi is more distant from the reception section 34. As for the delay time TD, the relationship of X1>X2> . . . >X7, i.e., TD1>TD2> . . . >TD7, holds.

The AD conversion section 36 shown in FIG. 1 samples an analog voltage signal E output from the IV conversion section 35 and converts sampling values to a digital signal. In the present embodiment, the output of the IV conversion section 35 is directly supplied to the AD conversion section 36, without being transmitted through an integration circuit or the like.

Figure 2:
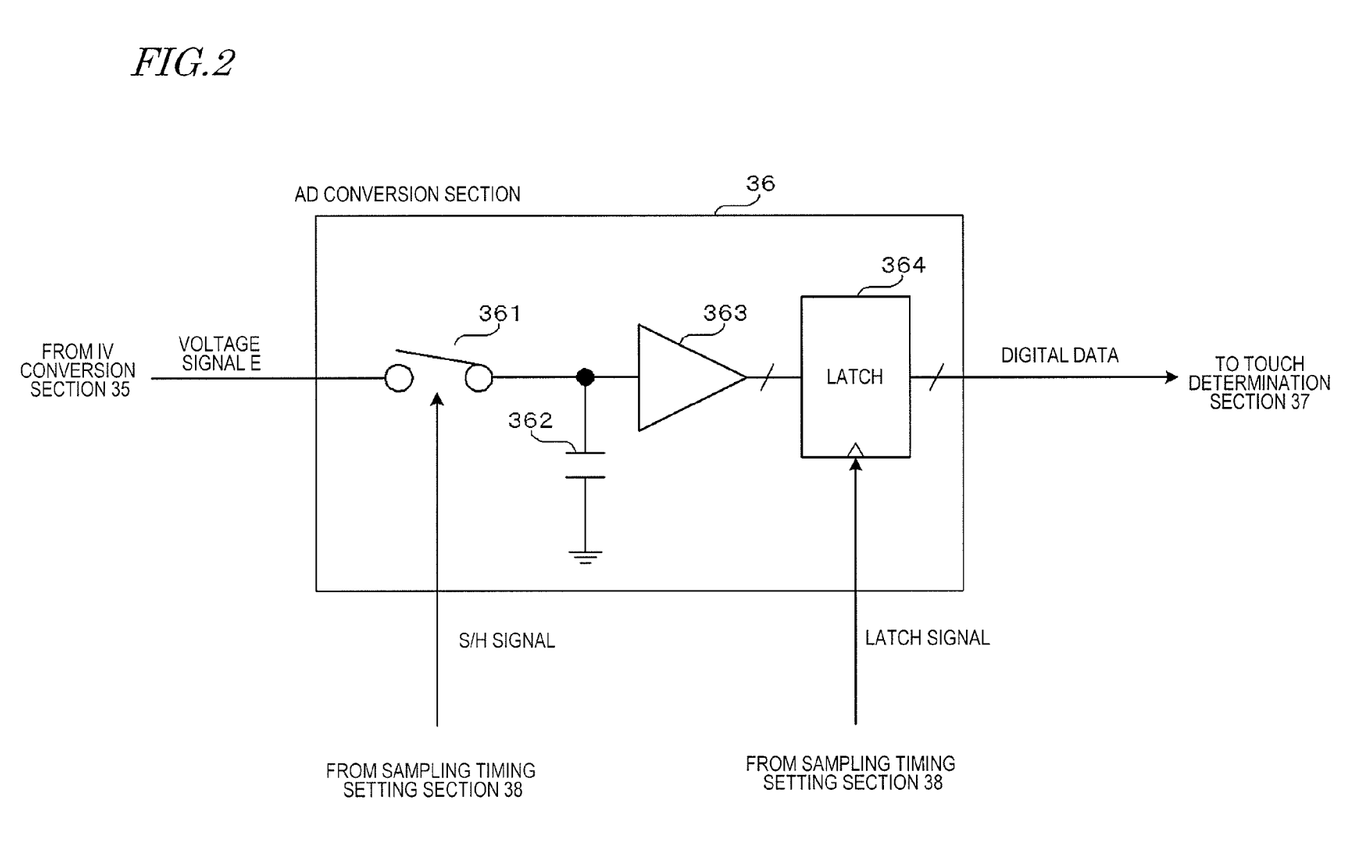
FIG. 2 is a block diagram of an AD conversion section shown in FIG. 1.

The AD conversion section 36 includes a sampling switch 361, a sampling capacitor 362, an AD conversion circuit 363, and a latch 364 as shown in FIG. 2.

Figure 7:
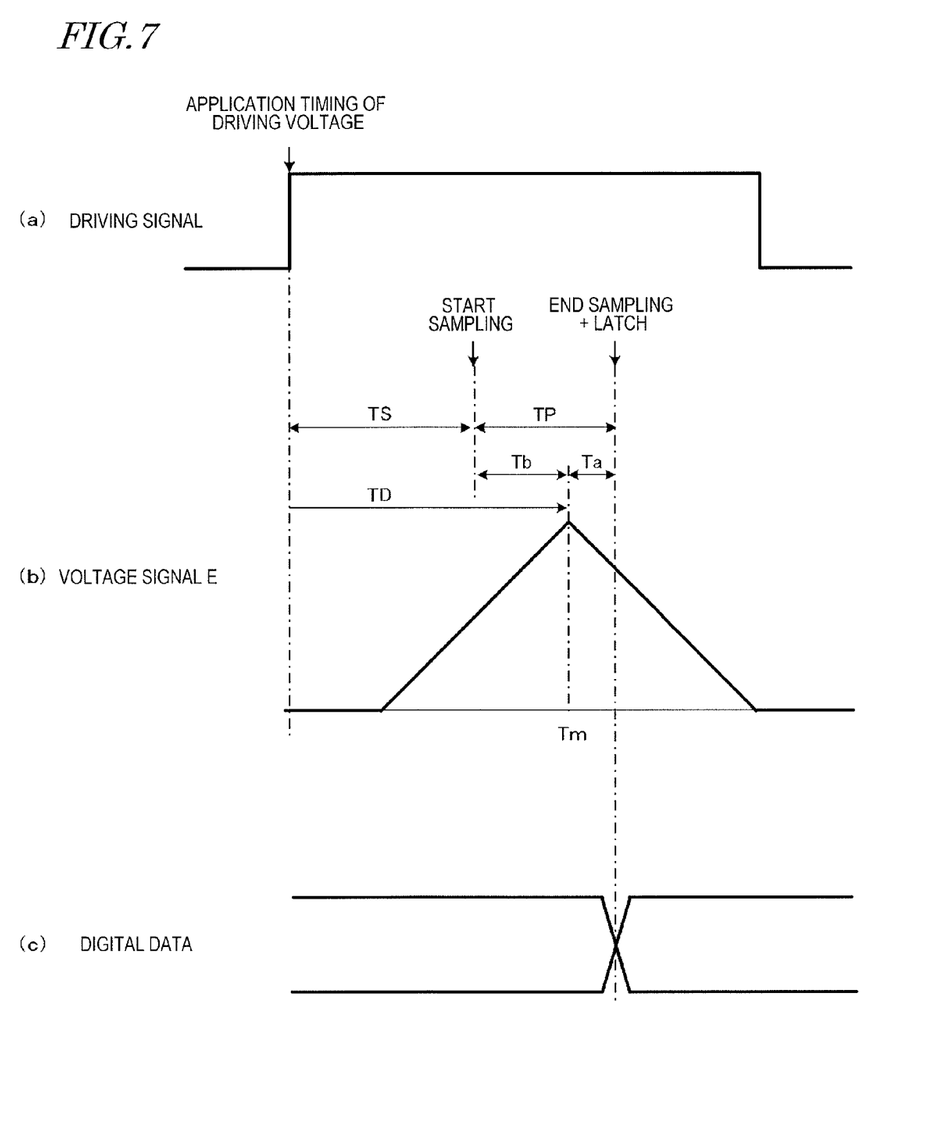
FIG. 7 is a chart for illustrating the sampling timing.

The sampling switch 361 is realized by a semiconductor switch, or the like, and is configured to turn on/off according to a S/H signal from the sampling timing setting section 38. In an ON-period, the sampling switch 361 supplies the voltage signal E output from the IV conversion section 35 to the sampling capacitor 362. The ON-period is controlled so as to be equal to a predetermined period TP which is the total of period Tb and period Ta that are prior to and subsequent to the timing Tm at which the voltage signal E obtained after the IV conversion is the maximum as shown in FIGS. 7(a) and 7(b), irrespective of the transmission electrode Xi to which the driving signal is applied.

The sampling capacitor 362 shown in FIG. 2 is charged with the supplied voltage E in a period where the sampling switch 361 is on, and holds the charged voltage.

The AD conversion circuit 363 converts the voltage held in the sampling capacitor 362 to digital data and outputs the digital data.

The latch 364 is realized by a D-FF (flip flop), or the like, and is configured to latch the digital data output from the AD conversion circuit 363 in response to a latch signal supplied from the sampling timing setting section 38 that will be described later. As a result, as shown in FIGS. 7(b) and 7(c), the digital data output from the AD conversion section 36 switches.

The touch determination section 37 shown in FIG. 1 determines presence/absence of a touch and the position of the touch from the digital data output from the AD conversion section 36, and outputs a detection signal. For example, when the digital data output from the AD conversion section 36 is smaller than a reference value (criterion value) at a timing where the transmission section 33 applies a driving signal to the transmission electrode Xi and the reception section 34 takes in the charge/discharge current of the reception electrode Yj, the touch determination section 37 determines that there was a touch at an electrode intersection position (i, j). In this case, the touch determination section 37 outputs a detection signal which is indicative of the presence of a touch and the position (i, j) of the touch.

The sampling timing setting section 38 sets the timing of turning on the sampling switch 361 of the AD conversion section 36.

As shown in FIGS. 6(a) and 6(b), the delay period TD between application of the driving signal and the timing Tm at which the voltage signal E obtained after the IV conversion exhibits a peak varies depending on the position of the transmission electrode Xi, so that the relationship of TD1>TD2> . . . >TD7 holds.

Therefore, when the sampling period TP is set with a fixed timing, an appropriate sampling timing can be achieved for some of the transmission electrodes while, however, an inappropriate timing at which the voltage signal E does not exhibit a peak results for the other transmission electrodes.

Thus, the sampling timing setting section 38 controls the timing of sampling and conversion based on the delay time TD. More specifically, the sampling timing setting section 38 controls the timing of sampling and conversion based on the delay time TD such that the AD conversion section 36 samples the voltage signal E during the sampling period TP that is a certain period including a timing at which the voltage signal E exhibits a peak, and the sampling voltage is converted to digital data. Note that the length of the sampling period TP is different from the integration period of the conventional technology. Specifically, the length of the sampling period TP is not more than a ½ period of the driving signal and is not more than a half period of the voltage signal E.

Figure 3:
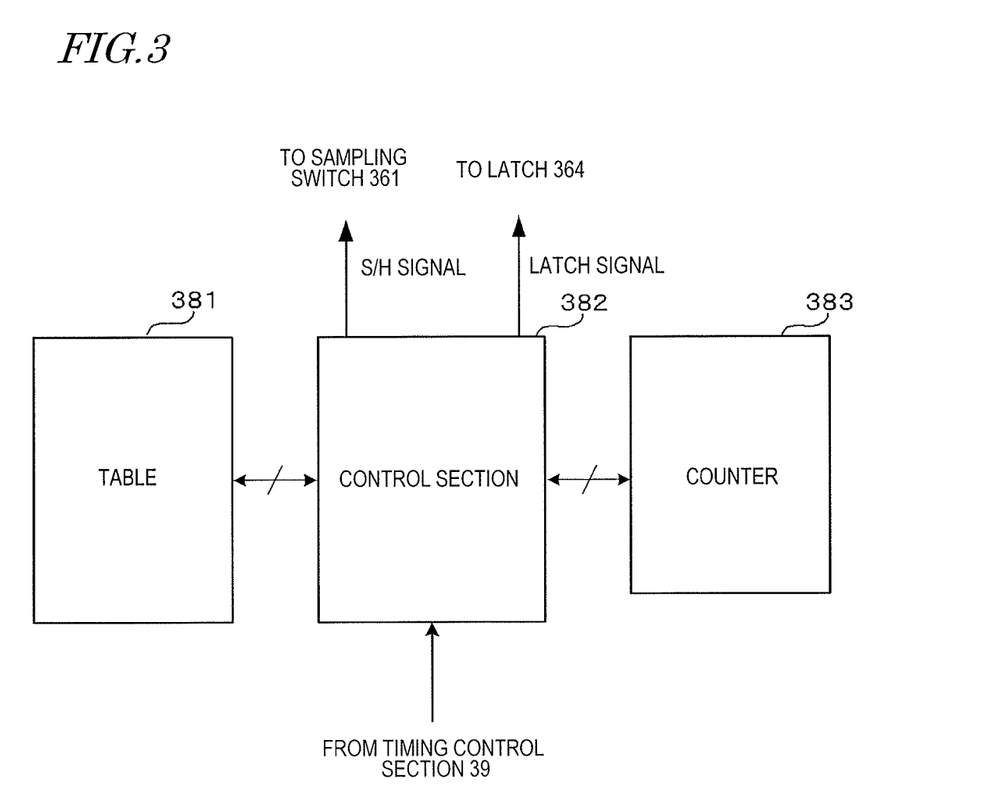
FIG. 3 is a block diagram of a sampling timing setting section shown in FIG. 1.

To enable such an adjustment, the sampling timing setting section 38 includes a table 381, a control section 382, and a counter 383 as shown in FIG. 3.

Figure 4:
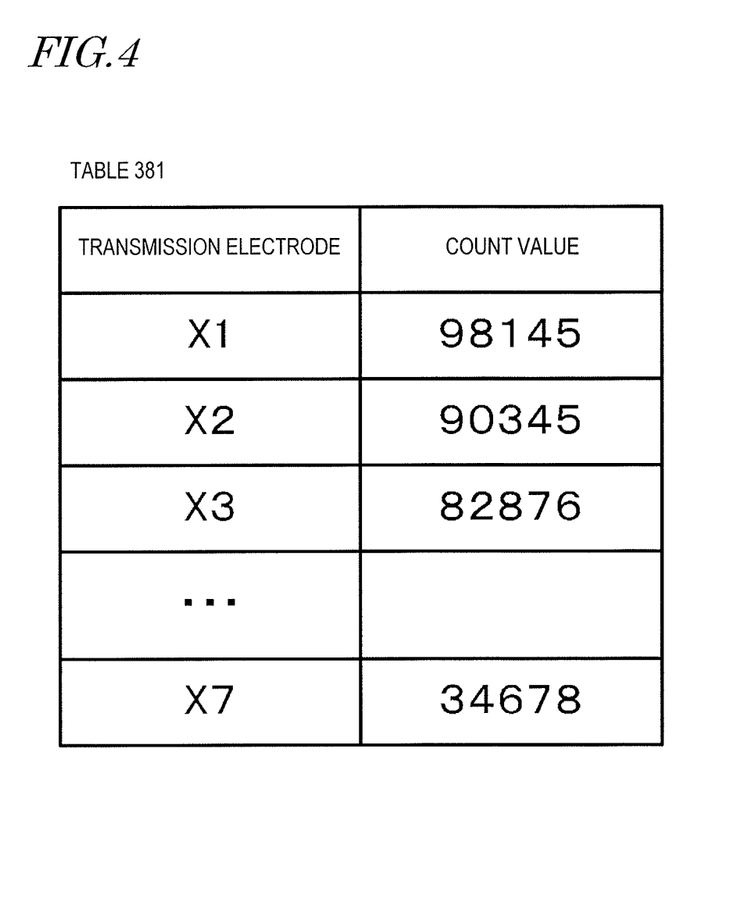
FIG. 4 is a chart showing an example of the count values for respective ones of the transmission electrodes, which are stored in a table shown in FIG. 3.

In the table 381, as shown in FIG. 4, count values corresponding to the time TS shown in FIG. 7 are set for respective ones of the transmission electrodes X1 to X7. More specifically, in the table 381, the count values corresponding to the time of "TD-Tb" are set. Here, TD is a period between application of the driving signal (a rising edge of the driving signal) and the timing Tm at which the voltage signal E exhibits a peak. Tb represents a sampling period which occurs prior to the peak timing Tm. The count values set in the table 381 are appropriately determined experimentally or theoretically. When receiving from the timing control section 39 a signal which instructs switching of the transmission electrode Xi, the control section 382 retrieves the count value for the indicated transmission electrode from the table 381 and sets it in the counter 383.

Then, when receiving from the timing control section 39 a signal which is indicative of application (rising edge) of the driving signal, the control section 382 starts a counting operation of the counter 383. Accordingly, the counter 383 starts counting. After the passage of the period TS (=TD−Tb) since the application of the driving signal, the counter 383 ends the preset counting and informs the control section 382 about the ending of the counting. The control section 382 then turns on the S/H signal, thereby turning on the sampling switch 361.

Then, the control section 382 sets the count value corresponding to the sampling period TP in the counter 383 and starts a counting operation.

After ending the counting, the counter 383 informs the control section 382 about the ending of the counting. The control section 382 turns off the S/H signal, thereby turning off the sampling switch 361. The control section 382 then outputs a latch signal to the latch 364 to latch the output data of the AD conversion circuit 363. As a result, only the voltage near the peak timing Tm of the voltage signal E is sampled and held by the sampling capacitor 362 and converted to digital data.

In this way, no matter which of the transmission electrodes Xi is selected, the AD conversion section 36 samples and holds the voltage signal E during a certain period TP which includes a timing at which the voltage signal E exhibits a peak, and subjects it to AD conversion. Note that it is desired that Tb>Ta and Ta≠0.

The timing control section 39 shown in FIG. 1 is realized by a processor, or the like, and is configured to control the entire operation sequence.

Specifically, the timing control section 39 instructs the pulse signal generation section 32 to periodically generate a driving signal (pulses). Meanwhile, the timing control section 39 controls the transmission section 33 so as to apply the driving signal generated by the pulse signal generation section 32 to the transmission electrode Xi as shown in FIGS. 5(a) to 5(c).

Further, the timing control section 39 instructs the reception section 34 to sequentially switch the reception electrodes Y1 to Y7 as shown in FIG. 5(d) and take in the currents I therefrom. Meanwhile, the timing control section informs the touch determination section 37 about a selected combination (i, j) of the transmission electrode Xi and the reception electrode Yj. Also, the timing control section 39 informs the sampling timing setting section 38 about switching of selection of the transmission electrodes, switching of the driving signal, etc.

Next, a touch detection operation (touch panel driving method) of the touch panel device 11 that has the above-described configuration is described. When powered on, the timing control circuit 39 instructs the pulse signal generation section 32 to generate a driving signal at constant intervals and output the generated driving signal.

Then, the timing control section 39 controls the transmission section 33 to sequentially apply the driving signal generated by the pulse signal generation section 32 to the transmission electrodes Xi such that seven pulses are applied to every one of the transmission electrodes Xi as shown in FIGS. 5(a) to 5(c). Further, the timing control section 39 controls the reception section 34 to sequentially select the reception electrodes Y1 to Y7 in synchronization with the timing of applying the driving signal as shown in FIG. 5(d).

Thus, due to the driving signal applied to the transmission electrode Xi, a voltage is induced to the reception electrode Yj so that a current I flows. The IV conversion section 35 converts this current I to the voltage signal E. The voltage signal E has such an alternating waveform that peaks of the positive polarity and peaks of the negative polarity alternately occur corresponding to rising edges and falling edges of the driving signal as shown in FIG. 5(e).

The control section 382 of the sampling timing setting section 38 instructs the counter 383 to start counting the count value, which is determined beforehand for every one of the transmission electrodes and stored in the table 381, at the timing of a rising edge of the driving signal. Thereafter, at the time when the period TS that is determined for every one of the transmission electrodes elapses and the counter 383 finishes counting, the control section 382 sends the S/H signal to turn on the sampling switch 361 of the AD conversion section 36. Thus, sampling of the voltage signal E is started.

The control section 382 instructs the counter 383 to start counting of a count value corresponding to the sampling period TP. When the sampling period TP elapses and the counter finishes counting, the control section 382 sends the S/H signal to turn off the sampling switch 361. Then, the control section 382 outputs a latch signal to the latch 364 to latch the digital data output from the AD conversion circuit 363.

Thus, the AD conversion section 36 samples the voltage signal E at relatively identical timings which include the peak timing Tm of the voltage signal E, irrespective of the positions of the transmission electrodes and the variation of the delay time TD which is attributed to the positions of the transmission electrodes.

The touch determination section 37 detects a change of the digital data output from the AD conversion section 36. For example, when the digital data of a position is smaller than the digital values obtained at neighboring electrode intersection positions or when relatively small digital data is obtained at the same position in different frames, the touch determination section 37 determines that there was a touch at that position and outputs a detection signal.

With such a configuration, the AD conversion section 36 samples the voltage signal E only during the sampling period TP near the timing Tm at which the voltage signal E exhibits a peak, irrespective of the variation of the delay time TD. Therefore, the sampling can be carried out during a period where the voltage level of the voltage signal E is relatively high, irrespective of the variation of the delay time TD. Thus, the sampling requires only a short period of time, and the variation of the sampling values is small. Also, the sampling is less vulnerable to noise. Further, it is not necessary to provide an integration circuit for time-integrating the output of the IV conversion section 35. Thus, a touch panel can be provided which is capable of high speed operation and which is less vulnerable to noise.

Note that, in the present embodiment also, the sampling capacitor 361 integrates the voltage signal E for about a predetermined time (e.g., ns order). However, this time integration is for sample holding for the AD conversion. That is, the voltage signal E is time-integrated only during the sample hold period TP. On the other hand, in the integration circuits of the conventional technology (e.g., disclosed in Documents 1 to 3), the voltage signal is integrated over several pulse periods. That is, the function of the conventional integration circuits is different from the sampling capacitor 361.

Various embodiments and variations of the present invention are possible without departing from the broader spirit and scope of the present invention. The above-described embodiment is illustrative purpose only and does not intend to limit the scope of the present invention. That is, the scope of the present invention is demarcated by the claims rather than the embodiment. Various variations made within the claims and the scope of the spirit of the invention which is equivalent to the claims are to be regarded as being within the scope of the present invention.

For example, in the above-described embodiment, only one positive peak portion of the voltage signal E is a target of the sampling, although the present invention is not limited to this example. Only one negative peak portion may be a target of the sampling. In this case, the application timing of the driving signal may be set at a falling edge of the driving signal.

An absolute value amplifier may be provided subsequent to the IV conversion section 35 such that sampling periods TP are provided near two peaks for one driving pulse. In this case, digital data obtained by sampling in respective ones of the sampling periods TP may be output separately or may be averaged before being output.

Figure 8:
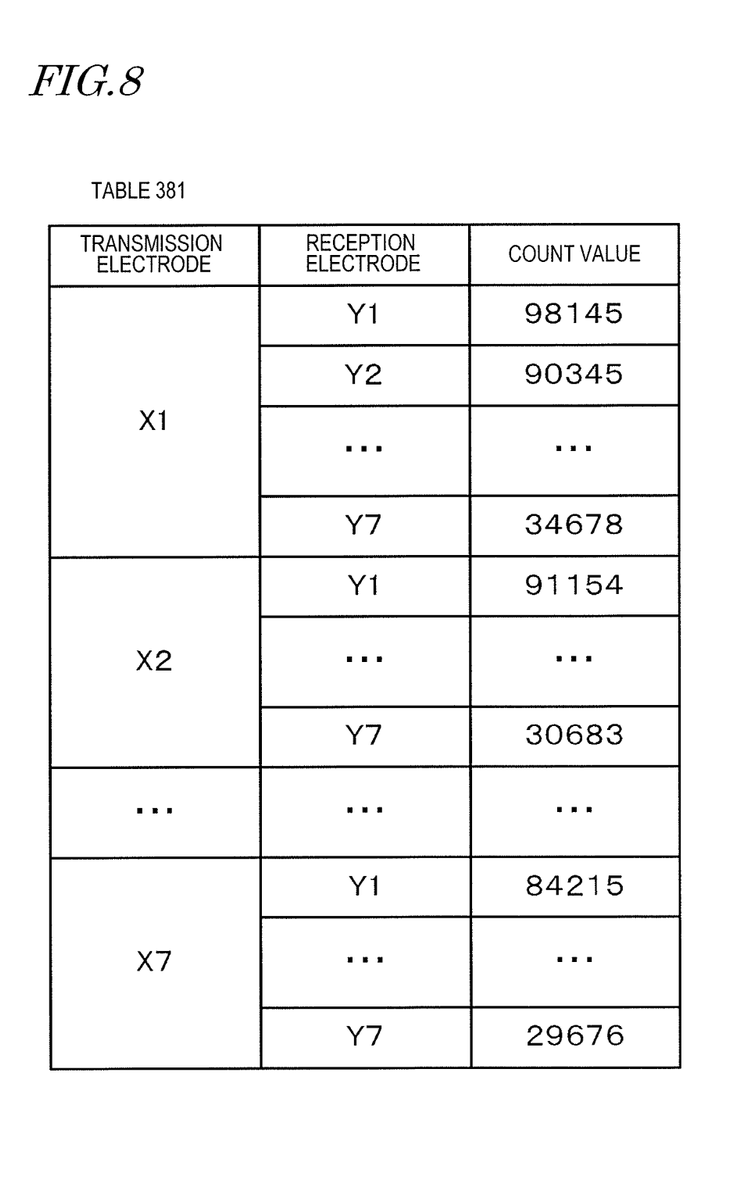
FIG. 8 is a chart showing an example of the count values for respective combinations of transmission electrodes and reception electrodes, which are stored in the table shown in FIG. 3.

Although in the above-described embodiment the delay of a signal at the reception electrodes Y is considered and the timing of sampling is adjusted according to the position of the transmission electrodes X, the delay at the transmission electrodes X may be considered. In this case, the delay time is longer when the transmission electrode X is closer to the No. 1 and the reception electrode Y is closer to the No. 1, and the delay time is shorter when the transmission electrode X is closer to the No. 7 and the reception electrode Y is closer to the No. 7. Therefore, to accord with this relationship, the count values which are to be counted by the counter 383 may be set in the table 381 according to the combinations of the transmission electrodes X and the reception electrodes Y as illustrated in the example of FIG. 8. Note that the count values which are to be set are experimentally or theoretically determined beforehand.

Although in the above-described embodiment the sampling timing of the AD conversion section 36 is adjusted, for example, the voltage signal E output from the IV conversion section 35 may be delayed by a time which is determined according to the position of a transmission electrode X to which the driving signal is to be applied, and the sampling and the AD conversion may be carried out at a time when a certain period of time elapses since output of the driving signal from the AD conversion section 36. The delay circuit may be, for example, a RC-type delay circuit whose capacitance varies according to a control signal. The delay circuit may be realized by a clock delay circuit, such as counter decode or flip flop.

Thus, so long as the timing Tm at which the voltage signal E exhibits a peak and the sampling period TP of the AD conversion section 36 can be made to relatively accord with each other, the method for achieving the relative accordance is arbitrary.

Although in the above-described embodiment a current-voltage conversion is carried out, the voltage of the reception electrodes may be directly sampled and AD-converted.

Although in the above-described embodiment the number of transmission electrodes and the number of reception electrodes are seven for the sake of easy understanding, the number of transmission electrodes and the number of reception electrodes are arbitrary.

A circuit configuration example of the AD conversion section 36 and a circuit configuration example of the sampling timing setting section 38 are shown in FIG. 2 and FIG. 3, respectively. These are merely exemplary and can be appropriately changed so long as substantially the same functions can be realized. For example, the sampling switch 361 and the sampling capacitor 362 may be removed from the circuit configuration of the AD conversion section 36 shown in FIG. 2, the voltage signal E may be converted to digital data by the AD conversion circuit 363, and the sampling timing setting section 38 may output a latch signal at the peak timing Tm (or immediately after the peak timing Tm) to activate the latch 364. In this case, substantially, the voltage signal E at the peak timing Tm (or immediately after the peak timing Tm) is sampled and AD-converted. Thus, the peak timing Tm (or immediately after the peak timing Tm)=the sampling timing=the latch timing.

An amplification circuit or the like may be provided subsequent to the IV conversion section 35, and the amplified voltage signal E may be AD-converted by the AD conversion section 36. In this case, desirably, the delay time TD which includes the delay caused by the amplification circuit is considered in determining the count values which are to be set in the table 381.

Various embodiments and variations of the present invention are possible without departing from the broader spirit and scope of the present invention. The above-described embodiment is illustrative purpose only and does not intend to limit the scope of the present invention. That is, the scope of the present invention is demarcated by the claims rather than the embodiment. Various variations made within the claims and the scope of the spirit of the invention which is equivalent to the claims are to be regarded as being within the scope of the present invention.

This application is based on Japanese Patent Application No. 2013-192425 filed on Sep. 17, 2013 and contains the specification, claims, drawings and abstract of the Japanese Patent Application. The entire disclosure of the Japanese Patent Application is incorporated by reference in this specification.

REFERENCE SIGNS LIST 11 touch panel device
21 panel main body
31 detection section
32 pulse signal generation section
33 transmission section
34 reception section
35 IV conversion section
36 AD conversion section
37 touch determination section
38 sampling timing setting section
39 timing control section
361 sampling switch
362 sampling capacitor
363 AD conversion circuit
364 latch
381 table
382 control section
383 counter

The invention claimed is:

1. A touch panel device, comprising:
a panel main body including a plurality of first electrodes extending parallel to one another and a plurality of second electrodes extending parallel to one another, the first and second electrodes being in a lattice arrangement; and
a touch detection circuit detecting a touch position based on a sampling value, the touch detection circuit including a transmission circuit applying a driving signal to the first electrodes, and the touch detection circuit including a sampling circuit connected with one end of each of the plurality of second electrodes sampling an induced signal to the second electrodes by the application of the driving signal,
wherein the detection circuit samples the induced signal in a sampling period set at a timing which is determined beforehand according to a first electrode to which the driving signal is to be applied, and samples the induced signal for a predetermined sampling period after a preset time, which is determined beforehand for each of the first electrodes to which the driving signal is applied, elapses since the application of the driving signal, and wherein the preset time is determined relative to an application timing of the driving signal to each of the first electrodes such that the preset time increases as the first electrode is more distant from one end of the second electrodes.

2. The touch panel device of claim 1, wherein the sampling period is set at a timing which is determined beforehand according to a first electrode to which the driving signal is applied and within a period which includes a timing of a peak of a waveform of the induced signal.

3. The touch panel device of claim 1, wherein the sampling period is shorter than one period of the driving signal.

4. The touch panel device of claim 1, wherein the detection circuit samples the induced signal for a predetermined sampling period after a preset time which is determined beforehand for each of combinations of the first electrodes to which the driving signal is applied and the second electrodes to which the induced signal is induced elapses since the application of the driving signal.

5. The touch panel device of claim 1, wherein the touch detection circuit includes a current-voltage conversion circuit sequentially selecting the plurality of second electrodes and converting a current flowing through the selected second electrode to a voltage signal, an AD conversion circuit sampling the converted voltage signal and converting it to digital data, and a touch determination circuit determining the presence/absence of a touch from the digital data converted by the AD conversion section.

6. A touch panel driving method, comprising:

applying a driving signal to a first electrode of a panel which includes a plurality of first electrodes extending parallel to one another and a plurality of second electrodes extending parallel to one another, the first and second electrodes being in a lattice arrangement; and sampling an induced signal which is induced to the second electrodes by the application of the driving signal in a sampling period set at a timing which is determined beforehand according to a first electrode to which the driving signal is to be applied wherein the induced signal is induced for a predetermined sampling period after a preset time, which is determined beforehand for each of the first electrodes to which the driving signal is applied, elapses since the application of the driving signal and wherein the preset time is determined relative to an application timing of the driving signal to each of the first electrodes such that the preset time increases as the first electrode is more distant from one end of the second electrodes.

* * * * *